May 15, 1923. 1,455,173

L. W. SCARBOROUGH

CHOPPING AND SLICING MACHINE

Filed May 23, 1921  2 Sheets-Sheet 1

INVENTOR
L. W. Scarborough
BY
Adam E. Fisher
ATTORNEY

May 15, 1923.
L. W. SCARBOROUGH
CHOPPING AND SLICING MACHINE
Filed May 23, 1921   2 Sheets-Sheet 2
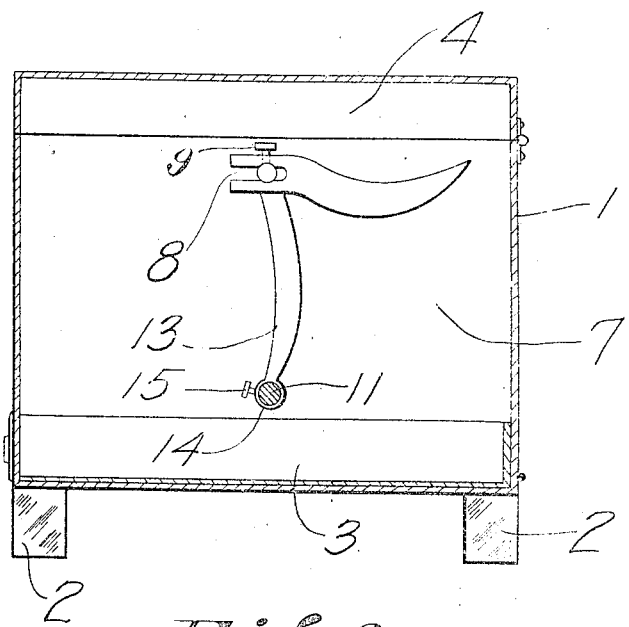
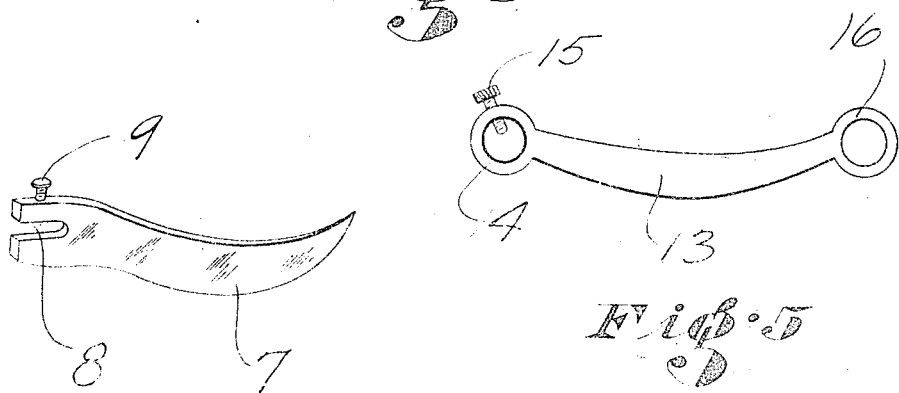

Patented May 15, 1923.

1,455,173

UNITED STATES PATENT OFFICE.

LEE W. SCARBOROUGH, OF HUMBLE, TEXAS.

CHOPPING AND SLICING MACHINE.

Application filed May 28, 1921. Serial No. 473,534.

*To all whom it may concern:*

Be it known that I, LEE W. SCARBOROUGH, a citizen of the United States, residing in the city of Humble and State of Texas, have invented new and useful Improvements in Chopping and Slicing Machines, of which the following is a specification, reference being had to the accompanying drawings.

This invention is in the nature of a chopping and slicing machine, designed for slicing loaves of bread entire at one stroke or turn of the cutting knives, or for slicing all kinds of vegetables and fruits, or for chopping cooked meats. The object of the invention is to provide a machine of this character of simple design and construction and which will do its work rapidly and efficiently.

In the drawings:

Figure 3 is a transverse sectional view.

Figure 4 is a detail view of one of the knives.

Figure 5 is a detail view of one of the rack guards.

Figure 1:
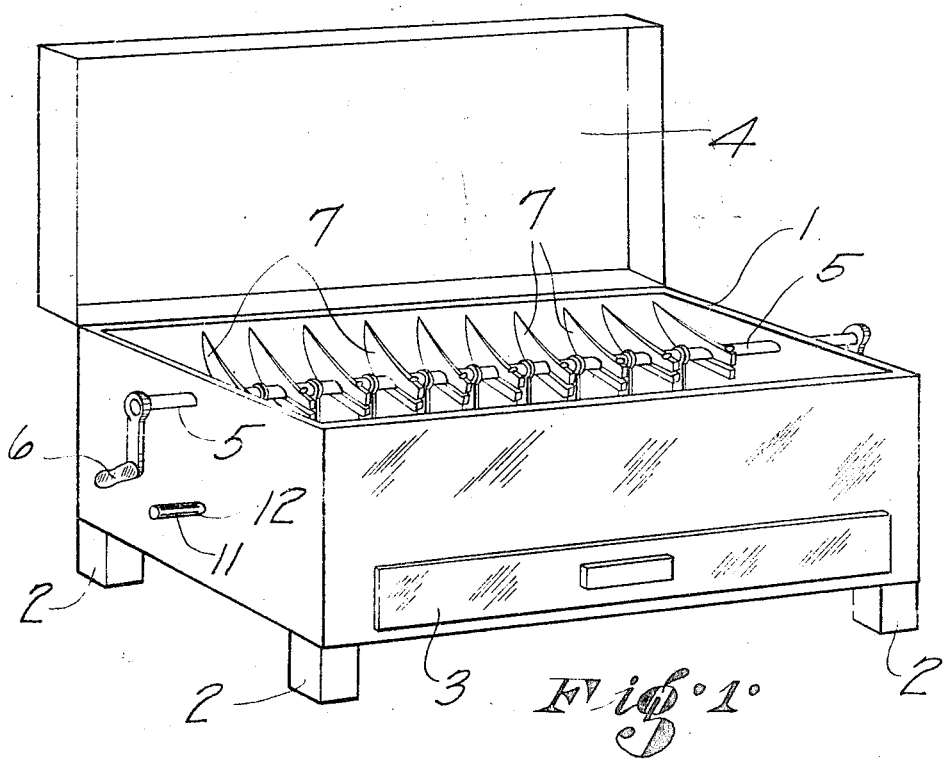
Figure 1 is a perspective view.
Figure 2:
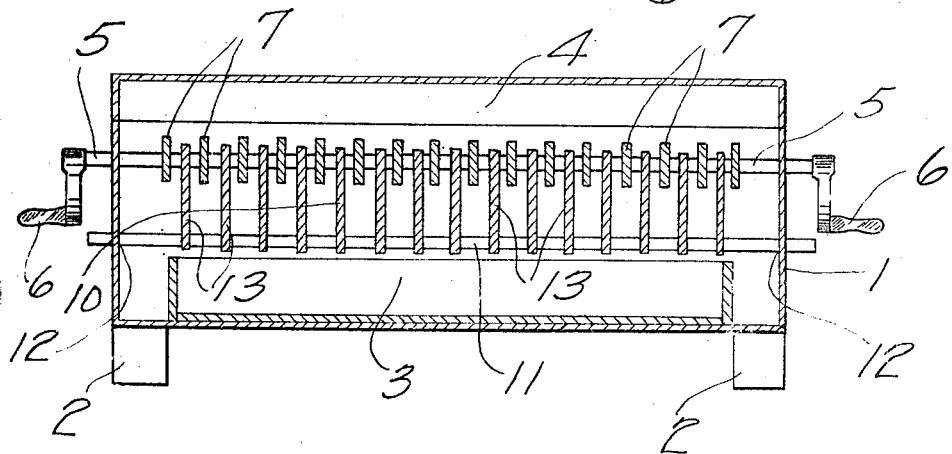
Figure 2 is a vertical, longitudinal sectional view.

The invention consists in providing a suitable case 1, having legs 2, a drawer 3 in the lower part and a lid 4 hinged to the top thereof. A knife shaft 5 is journaled through the case medially and upon the extended ends of this shaft are mounted cranks 6 to operate the machine. A plurality of curved cutting knives 7 having slots 8 in their shanks adapted to engage the shaft 5, are rigidly mounted on said shaft in alignment and in equally spaced relation by means of set screws 9 passed through the shanks of the knives and bearing upon the shaft 5. A vertically positioned rack 10 is provided by mounting a rack rod 11 through the lower part of the case between the points 12 and parallel to the shaft 5, and then extending between this rod and the shaft a plurality of curved rack guards 13, one between each pair of adjacent knives. These rack guards are provided with sleeves 14 at their lower ends adapted to receive the rod 11, and set screws 15 secure these lower ends firmly in place. The upper ends of the rack guards are likewise provided with sleeves 16 to loosely engage the shaft 5 which rotates within these sleeves 16.

In use the loaf of bread, or vegetables, or whatever is to be sliced is placed in the convex side of the rack 10, and the lid is closed. The knives which are curved are provided with convex cutting edges and they operate with a shearing action in cutting the material into slices. By one quick and strong turn upon either of the cranks 6 the bread or other food stuff in the rack is cut into slices by the rotation of the convexed knives 7, on their downward stroke as they pass through the rack guards 13.

While I have herein described a certain specific method of constructing and assembling the elements of my invention, it is understood same may be varied in minor details, not departing from the spirit of my invention as defined in the appended claim.

I claim:

A chopping and slicing machine comprising a suitable case; a knife shaft journaled medially through the case; a plurality of curved cutting knives on the knife shaft, aligned and spaced equally apart; a food holding rack vertically mounted below the knives, same including a rack rod mounted parallel to and below the knife shaft and a plurality of curved rack guards extended between the rack rod and the knife shaft, one guard between each pair of adjacent knives; and means for rotating the knife shaft.

LEE W. SCARBOROUGH.

Witnesses:
 D. T. HANCOCK,
 E. R. WUPFIELD.